United States Patent [19]

Schewe et al.

[11] Patent Number: 4,727,643
[45] Date of Patent: Mar. 1, 1988

[54] METHOD FOR MANUFACTURING A MAGNETIC HEAD BY A THIN-FILM TECHNIQUE

[75] Inventors: Herbert Schewe, Herzogenaurach; Dietrich Stephani, Erlangen, both of Fed. Rep. of Germany

[73] Assignee: Siemens Aktiengesellschaft, Munich, Fed. Rep. of Germany

[21] Appl. No.: 850,228

[22] Filed: Apr. 10, 1986

[30] Foreign Application Priority Data

Apr. 15, 1985 [DE] Fed. Rep. of Germany ....... 3513431

[51] Int. Cl.⁴ ............................................. G11B 5/127
[52] U.S. Cl. ..................... 29/603; 360/119; 360/122
[58] Field of Search ................. 29/603; 360/119, 126, 360/122, 123

[56] References Cited

U.S. PATENT DOCUMENTS

4,295,173 10/1981 Romankiw et al. ................ 360/123

FOREIGN PATENT DOCUMENTS

| 12910 | 7/1980 | European Pat. Off. |
| 96343 | 5/1983 | European Pat. Off. |
| 78374 | 5/1983 | European Pat. Off. |
| 3333590 | 9/1983 | Fed. Rep. of Germany |
| 53-74014 | 7/1978 | Japan |
| 54-5708 | 7/1979 | Japan |
| 57-212609 | 12/1982 | Japan |
| 58-57614 | 4/1983 | Japan |
| 58-118018 | 7/1983 | Japan |
| 58-128013 | 7/1983 | Japan |

OTHER PUBLICATIONS

"IEEE Transactions on Magnetics", vol. MAG-16, No. 1, Jan. 1980, pp. 71 to 76.

*Primary Examiner*—P. W. Echols
*Attorney, Agent, or Firm*—Kenyon & Kenyon

[57] ABSTRACT

A method for manufacturing a magnetic head by a thin-film technique which head comprises at least two magnet legs which have pole surfaces which face a recording medium and which lie in a common plane. With this method, a preliminary product of the magnetic head having end pieces of the legs which extend beyond this plane and which are spaced by a small gap, and an electrically conducting structure are applied in such a manner that this structure is separated, if the substrate body is processed by material removal from the side facing the recording medium, just when the plane of the pole surfaces has been reached, into two conductor parts electrically insulated from each other. With this method, the area portion required for the manufacture of a magnetic head on the substrate body is to be reduced. It is provided for this purpose that, for forming the preliminary product of the magnetic head, at least in the region of the gap between the end pieces of the magnet legs, one of the magnet legs is provided with a thin metal layer electrically insulated therefrom as the one conductor part of the conductor structure, and the second magnet leg is deposited as the other conductor part in the region of its end piece directly on the metal layer.

5 Claims, 2 Drawing Figures

METHOD FOR MANUFACTURING A MAGNETIC HEAD BY A THIN-FILM TECHNIQUE

BACKGROUND OF THE INVENTION

The present invention relates to a method for manufacturing a magnetic head by a thin-film technique, which head comprises a magnetic conduction body for carrying magnetic flux and which is similar to a ring head having at least two magnet legs which define an enlarged space through which the turns of at least one write and/or read coil winding extend and which have pole surfaces facing a recording medium disposed in a common plane having a predetermined small spacing from each other, in which method a preliminary product of the magnetic head is formed on a substrate body, the magnet legs of which extend beyond the plane of the pole surfaces and there form end pieces which are spaced by only a small gap and which are worked off by material-removing machining of the substrate body from the side facing the recording medium up to the plane of the pole surfaces, a conductor structure of electrically conducting material is furthermore applied to the substrate body in such a manner that this structure is separated, just when the plane of the pole surfaces is reached in the material-removing machining of the substrate body, into two conductor parts electrically insulated from each other, and the electric resistance between these conductor parts is utilized for controlling the material-removing machining. Such a method is known, for instance, from DE-OS No. 33 33 590.

With this known method, magnetic heads for longitudinal (horizontal) as well as for perpendicular (vertical) magnetization of corresponding recording media can be produced. The principles of these types of magnetization for the storage of information are discussed, for instance, in the publication "IEEE Transactions on Magnetics", vol. MAG-16, no. 1, January 1980, pages 71 to 76. Magnetic heads known per se which can be used for these types of magnetization can comprise, in particular, a conducting body for carrying the magnetic flux, designed similar to a ring head and having at least two magnet legs of high-permeability material. These magnet legs define a space which is enlarged due to an increase of their mutual spacing, through which the turns of at least one write and/or read coil winding extend and develop, on the side facing the recording medium, magnet poles which are arranged one behind the other with a predetermined small spacing. The surface of these poles facing the recording medium should come to lie in a common plane which extends at least approximately parallel to the surface of the recording medium.

The exact design of such magnet legs, however, encounters difficulties in magnetic heads which are to be produced by a thin-film technique (see the DE-OS cited above). One is therefore compelled to develop on a nonmagnetic substrate body, first, a preliminary product of at least one magnetic head in such a way that the magnet legs are extended beyond the plane of the pole pieces in the direction toward the recording medimm. In this extended region, the magnet legs form essentially parallel extending end pieces which are spaced only by a narrow gap which is also called the air gap. On the substrate body, an auxiliary structure of electrically conducting nonmagnetic material must be formed which represents a conductor structure or loop, with the aid of which the removal of material of the substrate body of the at least one magnetic head from the side facing the recording medium can be assured up to the plane in which the surfaces of the poles of the magnet leg of the magnetic head are to lie.

Accordingly, one conductor structure called a guiding mark or a machining sensor or feeler is applied, in the known method, to the flat side carrying the magnetic head, of a substrate body on both sides of the head. For forming these structures, an electrically conducting base surface is deposited first which covers zones to both sides of the measuring line which is defined by a plane in which the pole surfaces of the magnet leg to be formed are to extend. This base surface is then coated partially with a barrier surface of insulating material, wherein this barrier surface extends from above exactly to the measuring line fixed by the plane. Above this barrier surface protrudes from below, in finger-fashion, a further electrically conducting conductor surface which is connected to the region of the base surface which is exposed below the mentioned line and is not covered by the barrier surface, in an electrically conducting manner. If now the substrate body is ground off from its underside facing the recording medium by a material-removing process such as lapping or another kind of precision machining, the electrical contact between the finger-shaped conductor surface and the base surface of the conductor structure is eliminated when the measuring line is reached. The change in resistance between these two conductor parts connected therewith can then be utilized as a control signal for stopping the material-removing processing.

In this known method, the pole height, i.e., the vertical extent of the pole zone, in which the end pieces of the two magnet legs are parallel to each other, and thereby the desired position of the pole surfaces of the magnet legs, can be adjusted only indirectly by means of conductor structures representing auxiliary designs. An appropriate control of the material-removing processing of the substrate body and thereby, of the magnet legs in their pole zone, however, is rather costly, and a relatively large portion of the area is occupied by the auxiliary design on the substrate body. As a result, the number of magnetic heads which can be deposited simultaneously side by side on an available area of a substrate body is reduced accordingly.

SUMMARY OF THE INVENTION

It is therefore an object of the present invention to simplify the method of the type mentioned above and to provide a method wherein the area required for manufacturing a magnetic head on the substrate body is reduced.

The above and other objects of the present invention are achieved by a method for manufacturing a magnetic head by a thin-film technique which head comprises a conduction body for carrying the magnetic flux and which includes at least two magnet legs defining an enlarged space through which the turns of at least one write and/or read coil winding extends and which have pole surfaces facing a recording medium disposed in a common plane with a predetermined small spacing from each other, which method comprises the steps of forming a preliminary product of the magnetic head on a substrate body, the magnet legs of which extend beyond the plane of the pole surfaces and form thereby end pieces which are spaced by only a small gap, applying a conductor structure of electrically conducting material to the substrate body, removing the end pieces with material-removing machining of the substrate body from the side facing the recording medium up to the plane of the pole surfaces such that this structure is separated, just when the plane of the pole surfaces is reached in the material-removing machining of the substrate body, into two conductor parts electrically insulated from each other, and the electric resistance between these conductor parts is utilized for controlling the material-removing machining, said step of forming comprising making the preliminary product of the magnetic head at least in the region of the gap between the end pieces of the magnet legs such that one of said magnet legs is provided with a thin metal layer electrically insulated from the magnet leg as the one conductor part of the conductor structure, and depositing the second magnet leg as the other conductor part in the region of the end piece directly on the metal layer.

The advantages of the method according to the present invention are in particular, that the conductor structure for controlling the material-removing processing of the substrate body or the magnet legs of the magnetic head placed there are integrated into the magnetic conduction body of the magnetic head, where the one conductor part is formed by the magnet leg which is designed as leading from its pole region to a larger spacing with respect to the metal layer. With this simple conductor structure, magnetic heads can then be formed without difficulty which have an almost negligibly small pole height in the vertical direction relative to the recording medium. Such magnetic heads are particularly advantageous with respect to the write and read properties according to the principle of vertical magnetization.

BRIEF DESCRIPTION OF THE DRAWING

With reference now to the drawings, the FIG. 1 shows schematically a magnetic head which can be produced by the method according to the invention.

DETAILED DESCRIPTION

Figure 1:
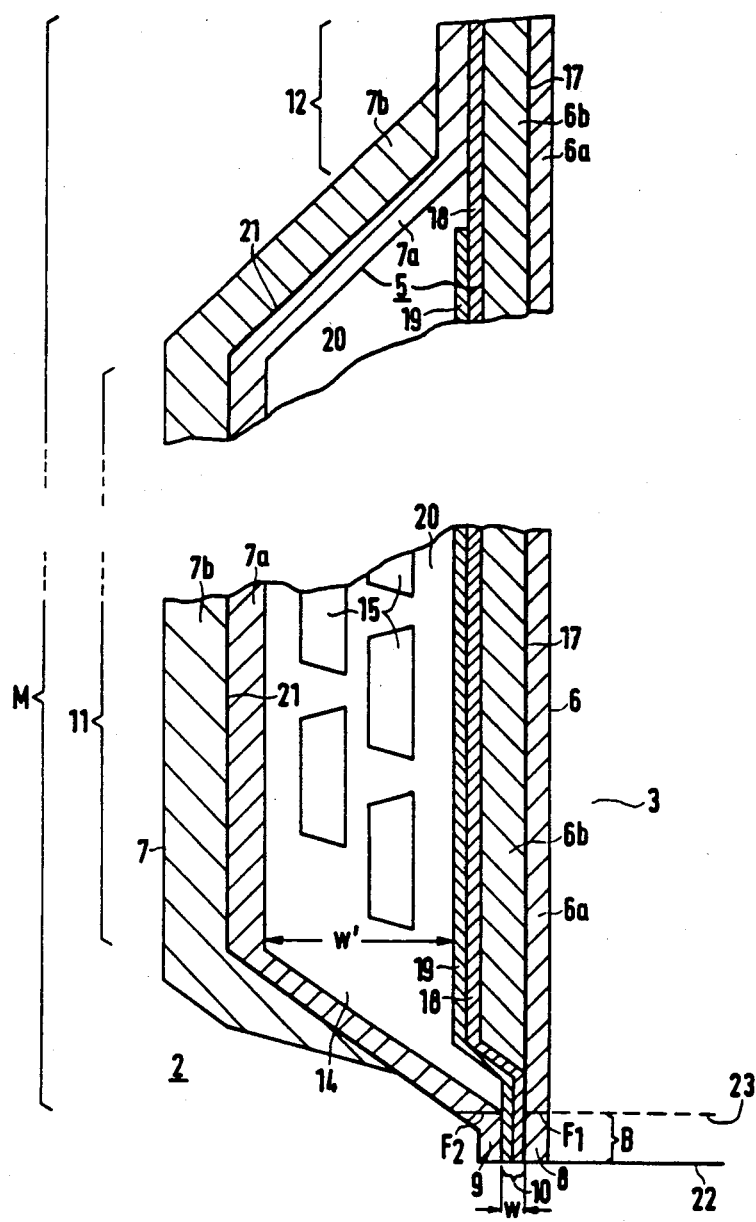
Figure 2:
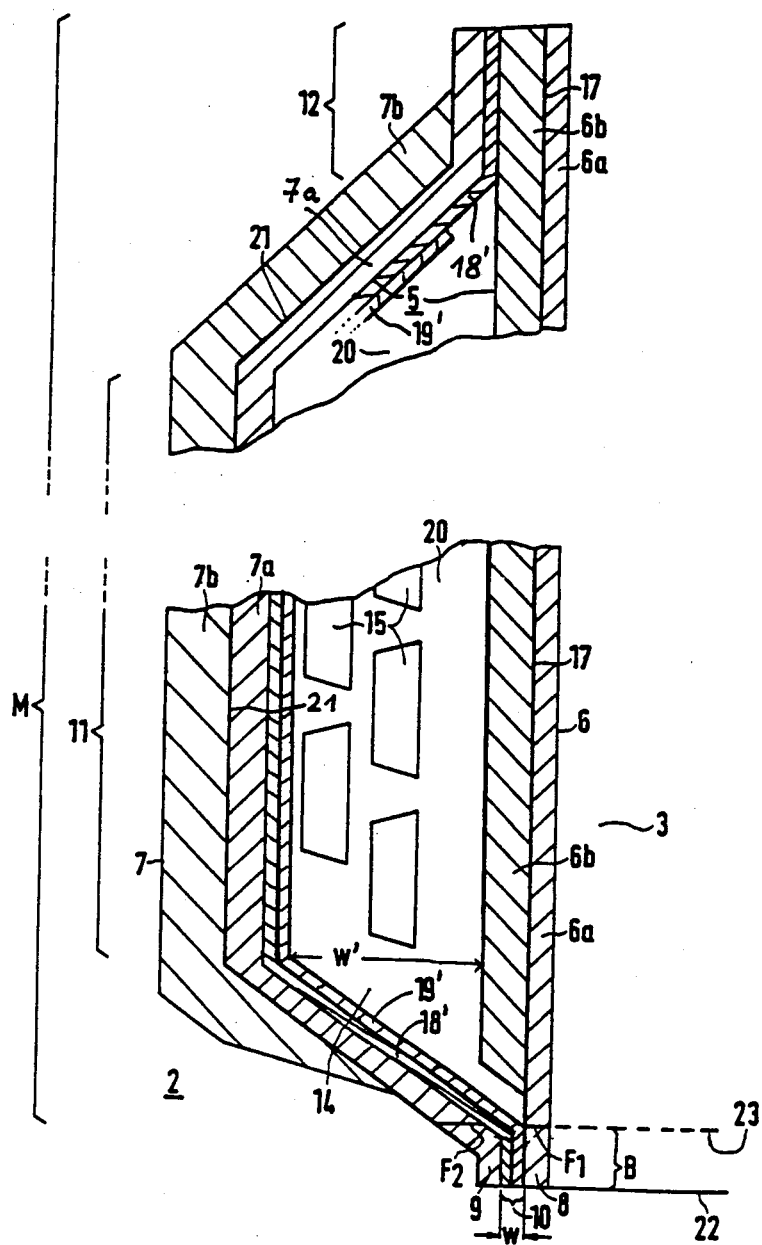
FIG. 2 illustrates a magnetic head which can be produced by the method of the present invention in which the electrical contact of layer 19' with leg part 8 of the magnet layer 6 in the region B is illustrated.

With reference now to the drawings, the figures shows the preliminary product of the magnetic head as a longitudinal section of a magnetic write and read head. Ring head-like designs known per se for the principle of vertical magnetization are taken as a basis (see, for instance, European patent No. 0 012 910 Al). In the figure, only the essential parts of this preliminary product designated with 2 are detailed while the part of this preliminary product forming the magnetic head proper is designated with M. The preliminary product 2 is located on the flat side of a substrate body 3 which forms, for instance, the end face or the back side of a customary element called the "flying body" which is not detailed in the figure.

The magnetic head M or its preliminary product 2 contains a ring head-like magnetic conduction body 5 for carrying the magnetic flux having two magnet legs 6 and 7. These legs are aligned at least largely and particularly in the region of their end pieces 8 and 9 facing the recording medium, at least approximately perpendicularly to the surface of the recording medium. Between them an air gap 10 is formed with an advantageously small longitudinal width w, i.e., in the direction of motion of the magnetic head, of less than 1 $\mu$m and in particular, less than 0.5 $\mu$m. In a central region 11 of the ring head-like conduction body 5, the spacing between the two magnet legs 6 and 7 is enlarged over the gap width w, in that, for instance, the magnet leg 7 which is backwards with respect to the direction of motion leads to a larger spacing w' in this region with respect to the magnet leg 6 which is made straight and is closest to the substrate body 3. Outside of this region 11, the magnet leg 7 is coupled on the side of the magnetic conduction body 5 of the magnet leg 7 facing away from the recording medium, to the magnet leg 6 in a connecting region 12 as known per se, so that then, the ring head-like form of the conduction body 5 is obtained. Through the space 14 thus available between the two magnet legs 6 and 7 in the central region 11 extends a flat coil winding 15 which can serve as a writing as well as a reading coil. This coil winding, which is only indicated generally in the figure, comprises one or more layers with a relatively large number of turns.

For manufacturing the magnetic head M or its preliminary product 2 by a thin-film or thin-layer technique, a nonmagnetic, electrically nonconducting substrate body 3 is generally used which comprises, for instance, TiC and Al$_2$O$_3$. Optionally, the substrate body 3 can further be provided with a sufficiently thick insulating layer, for instance, of Al$_2$O$_3$. For building up the magnet legs 6 and 7, several thin magnet layers of special magnetically soft high-permeability material such as special NiFe allows (Permalloy: Ni/Fe-81/19) or of FeB, CoZr or CoHf are generally applied by sputtering, vapor deposition or electroplating, and are separated from each other by respective thin nonmagnetic intermediate layers, for instance, of SiO$_2$ or Al$_2$O$_3$. Optionally, these intermediate layers can also be omitted, at least in part. All layers are then structured by techniques known per se such as photolithography, plasma-beam, ion-beam or wet-chemical etching so as to form the two magnet legs of the head.

For building up the preliminary product 2 of the magnetic head M, its inner magnet leg 6 is applied first. This magnet leg is relatively thick except for the region of its end piece 8 facing the recording medium, for instance, 2 to 4 $\mu$m thick and is tapered toward this end piece to about 0.2 to 2 $\mu$m. Accordingly, the magnet leg as per the embodiment comprises an inner magnetic layer 6a facing the substrate body 3 of relatively small thickness, on which outside the region of the end piece 8, a further magnetic layer 6b with comparably larger thickness is placed. Between these two magnetic layers 6a and 6b, there is an insulating layer 17, for instance, 0.1 $\mu$m thick. The so-formed magnet leg 6 is then coated with a thin insulating gap layer 18, for instance, 0.1 to 1 $\mu$m thick which advantageously comprises a hard material such as Al$_2$O$_3$. According to the invention, a thin layer 19 of a nonmagnetic electrically conducting material is deposited on this gap layer 18, where this layer advantageously protrudes, for reasons of subsequent contacting, from the region of the magnetic conduction body 5 of the magnet head. In addition, this layer should extend at least through an area of the magnetic head designated with B, in which the end pieces 8 and 9 of the magnet legs 6 and 7 to be formed extend parallel and are separated from each other only by the narrow gap 10. As is indicated in the embodiment shown, the metal layer 19 can extend up to the connecting region 12 of the magnet legs. This connecting region must generally be recessed with respect to this metal layer. If it is intended, however, that the metal layer 19 also extends through this area 12, an additional insulating layer must be applied there to it. As materials for the layer 19, metals like Cu or Al can be provided, for instance. Particularly advantageously, a Ti-layer about 0.2 82 m thick is used.

After the magnet leg 6 as well as the gap layer 18 and the metal layer 19 are completed, the individual turns of the winding 15 serving as the write and read coil are prepared likewise by a thin-layer technique in at least one plane parallel to the substrate body surface, and are structured. The turns of this generally multilayer winding which comprise, for instance, Cu, Au or Al, may have, for instance, cross sections of 3.5 $\mu m \times 3$ $\mu m$ and are embedded in a special insulating leveling material 20. This material can be, for instance, a plastic varnish, especially with a polyimide base.

In a next process step, the outer magnet leg 7, which is preferably also laminated, is applied and structured where, according to the embodiment shown, likewise a thinner magnetic layer 7a and a thicker magnetic layer 7b are assumed. The two magnetic layers 7a and 7b are separated from each other electrically, for instance, by an insulating layer 21. Their thicknesses can correspond, for instance, to those of the layers 6a and 6b. With the thinner magnetic layer 7a alone, which is facing the magnet leg 6, the end piece 9 of the magnet leg 7 is formed. This thinner magnetic layer 7a is separated in the region B of the gap 10 via the gap layer 18 and the metal layer 19 and in the central region 11 from the magnet leg 6 via the levelling material 20 with the turns of the coil winding 15 embedded therein. In the region B of the end piece, the magnet leg 7 rests with its magnetic layer 7a directly against the metal layer 19, while in the connecting region 12, on the side facing away from the recording medium, only the insulating gap layer 18 extends between the magnet legs 7 and 6..

Subsequently, the preliminary thin-layer product 2 can be coated for protection with a relatively thick protective layer, for instance, of $Al_2O_3$.

For realizing the final shape of the magnetic head M, the substrate body 3 with the preliminary product 2 placed thereon is finally subjected from its underside 22 facing the recording medium to material-removing processing, for instance, to a lapping process. Here, the material is advantageously worked off down to a plane which is indicated by a dashed line 23, at which the magnet legs 6 and 7 which are arranged parallel in the area B of the end pieces 8 and 9 begin to diverge, i.e., lead to a larger mutual spacing. In this plane, the pole faces of the two magnet legs 6 and 7 designated with $F_1$ and $F_2$ advantageously lie. In order to reach this position of the separating plane 23 and thus the position of the pole surfaces $F_1$ and $F_2$ in the material-removing processing, i.e., fixing it in the vertical direction, the electric resistance between the metal layer 19 and the magnetic layer 7a of the magnet leg is measured with known measuring devices during the material removal, since as long as the material removal is being performed still only in the region B under the separation plane 23, the electrical connection between the metal layer 19 and the magnetic layer 7a is provided. However, if the material removal has advanced up to the separating plane 23, the metallic connection between the two parts 7a and 19 is opened in this plane. The resistance increase connected therewith between these two parts can then serve as a signal that the desired depths of material removal and thereby, the position of the plane 23 or the pole surfaces $F_1$ and $F_2$ has been reached.

In the method according to the invention, the magnetic layer 7a consisting of electrically conductive material as well as the metal layer 19 therefore serve as conductor parts of a conductor structure integrated in the preliminary product 2 of the magnetic head M for controlling the material removal. While the metal layer 19 is advantageously applied insulated on the inner magnet leg 6 resting directly against the substrate body 3, one can optionally provide a corresponding metal layer also on the inside of the outer magnet leg 7 facing leg 6, where insulation between this layer and the leg 7 as well as metallic contact with the end piece 8 of the inner magnet leg 6 must be formed.

According to the embodiment for explaining the method according to the invention, as shown in the FIG. 1, it was assumed that a single magnetic head with two magnet legs is to be designed by this method. However, it is possible equally well thereby to produce simultaneously several magnetic heads on a substrate body, and a relatively large number can advantageously be accommodated thereon. The magnetic heads do not absolutely have to have only two magnet legs each but may also have three legs, for instance, (see, for instance, European patent No. 0 078 374 Al).

It was further assumed in the embodiment in FIG. 1 that, with the magnetic head, a write and/or read function by the principle of vertical magnetization can be executed. While the method according to the invention is advantageously provided for the manufacture of such magnetic heads, also magnetic heads can be produced with it equally well which work according to the principle of longitudinal (horizontal) magnetization.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. A method for manufacturing a magnetic head by a thin-film technique, which magnetic head comprises a magnetic conduction body for carrying magnetic flux and having at least two magnet legs which define an enlarged space through which the turns of at least one write and/or read coil winding extends and which have pole surface facing a recording medium disposed in a common plane with a predetermined small spacing from each other, the method comprising the steps of:

forming a preliminary product of the magnetic head on a substrate body, the magnet legs of the head extending beyond the plane of the pole surfaces and forming thereby end pieces which are spaced by only a small gap;

providing a conductor structure of electrically conducting material mechanically connected with the substrate body;

removing the end pieces simultaneously with material-removing machining of the substrate body from the side facing the recording medium up to the plane of the pole surfaces such that said conductor structure is separated, just when the plane of the pole surfaces is reached in the material-removing machining of the substrate body, into two conductor parts electrically insulated from each other;

measuring the electric resistance between these conductor parts for controlling the material-removing machining;

said step of forming comprising making the preliminary product of the magnetic head, at least in the region of the gap between the end pieces of the magnet legs, such that a first magnet leg is provided with a thin metal layer electrically insulated from the first magnet leg, and depositing the second magnetic leg in the region of its end piece directly on and in electrical contact with the metal layer, said second magnet leg and said metal layer forming said conductor structure.

2. The method recited in claim 1, further comprising the step of providing an insulating layer of a hard material between the first magnet leg and the metal layer.

3. The method recited in claim 1, wherein the metal layer is applied so as to be insulated from the first magnet leg, said first magnet leg facing the substrate body.

4. The method recited in claim 1, wherein the metal layer is formed such that it extends into a region comprising an enlarged space between the magnet legs.

5. The method recited in claim 1, wherein the metal layer comprises titanium.

* * * * *